April 3, 1956
A. G. THOMAS
2,740,184
ELECTRICALLY CHARGED MATERIAL
Filed March 1, 1951
2 Sheets-Sheet 1
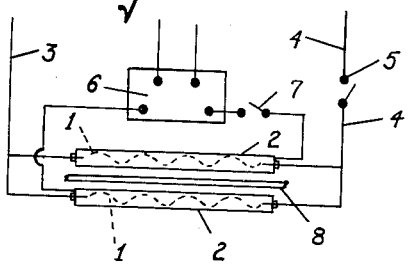
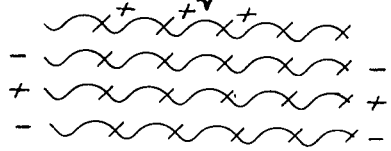
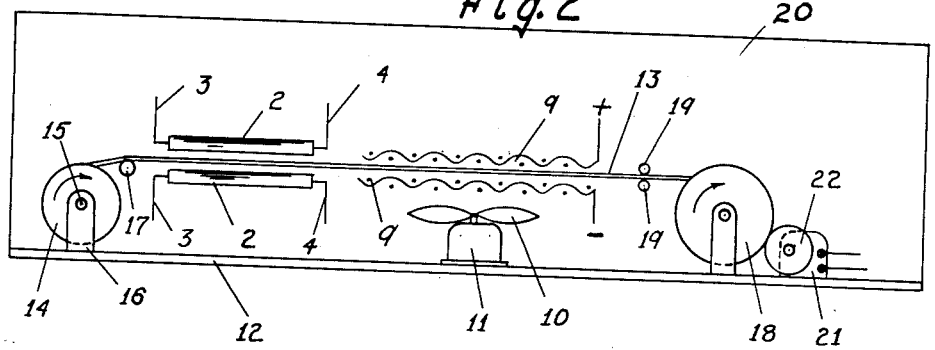
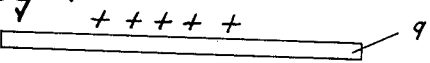
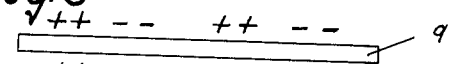
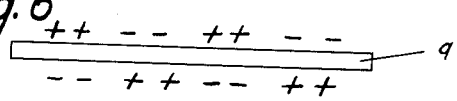
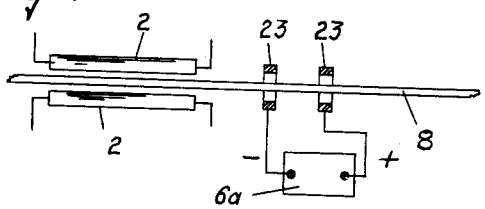
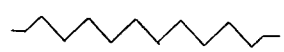
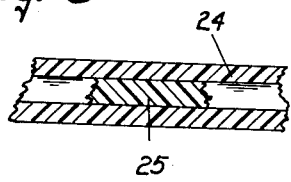
Albert G. Thomas INVENTOR.

April 3, 1956
A. G. THOMAS
2,740,184
ELECTRICALLY CHARGED MATERIAL
Filed March 1, 1951
2 Sheets-Sheet 2
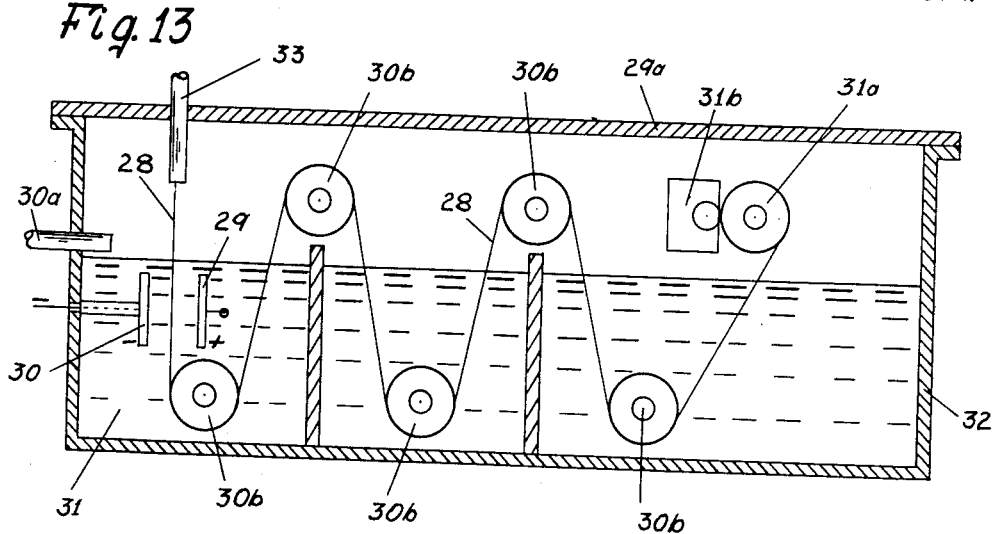
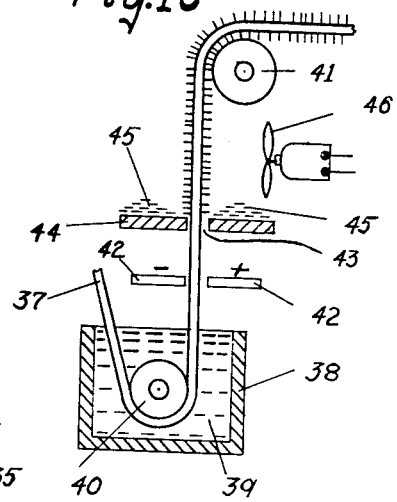
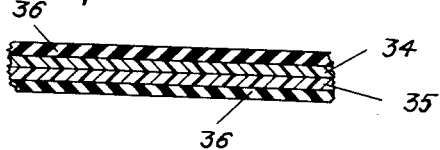
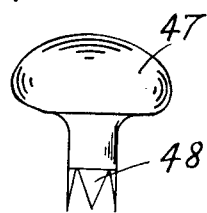
Albert G. Thomas INVENTOR.

United States Patent Office 2,740,184
Patented Apr. 3, 1956

2,740,184
ELECTRICALLY CHARGED MATERIAL
Albert G. Thomas, Chattanooga, Tenn.
Application March 1, 1951, Serial No. 213,340
10 Claims. (Cl. 28—78)

This invention relates to textiles, threads, special cloths and materials, and related devices.

In filters, and similar devices designed to separate solid materials from liquids or gases, many attempts have been made to increase the filtering action or solid-retaining ability by special mechanical structures, and various combinations of fabrics and the like. Mechanical filters employing such materials have often proved to be of limited usefulness in that they offer considerable resistance to fluid flow if fine filtering action is provided, becoming clogged relatively quickly, and if the filter channels are larger a greater proportion of solid material is allowed to pass through.

Furthermore, in many fabrics it is desirable, for maintaining warmth, for providing resiliency, and for other purposes, to have a fabric which has considerable air space, or which can be stretched without permanent deformation or both. Generally, past materials have been limited in entrapped air spaces as well as in stretching capabilities.

Furthermore, in dust mops, and other solids—collecting devices or materials the amount of dust or other substances collected, has been limited, with the result that the mop or other device has to be shaken frequently in order to be effective in collecting dust or the like.

It is an object therefore to provide a novel electrically charged thread, filament or fabric for use in filters, dust mops, dust cloths, air conditioning systems, carpet sweepers, and other devices, for attracting dust or other material electrically.

It is another object to provide charged thread or fabrics having either uniformity of charge pattern or, spots or lengths or areas of opposite charges.

A further object is to provide novel filaments, threads, or fabrics of greater heat insulation properties or greater absorptive characteristics, or both.

An additional object is to provide a special temperature-sensitive material, and a special moisture-sensitive material.

A further object is the provision of novel means for charging threads, filaments, fabrics and the like.

Other objects will appear in the specification.

In the drawings:

Figure 1 is an elevation showing a combined heating and charging system for filaments, threads, or fabrics.

Figure 2 is an elevation, in part section, of a sequential heating, charging, and cooling system for filaments, threads, or fabrics.

Figure 3 is an elevation, in section, of a composite or multi-layer fabric or the like.

Figure 4 is an edge or side view of a fabric or sheet or filament.

Figure 5 is a side view of a filament or thread, or an edge view of a fabric or sheet.

Figure 6 is another similar view of the object shown in Figure 5.

Figure 7 is an elevation, part section, of a modified electrical charging system for threads or the like. The same principles may be applied to sheets or fabrics.

Figure 8 is a fragmentary, sectional side view of a filamentary plastic or other tube, with wax or other core; or it may represent a section of fabric or a sheet made of filamentary tubular elements.

Figure 9 is a fragmentary elevation of a filament or string containing admixed metal or other particles.

Figure 10 is an elevation of a short piece of filament or string wound or formed in helical configuration.

Figure 11 is an elevation of a short piece of filament formed in zigzag fashion.

Figure 12 is an elevation of a short piece of filament, string, or ribbon of twisted formation.

Figure 13 illustrates, in part section, a system for extruding and electrically charging filaments while being hardened.

Figure 14 is a sectional elevation or edge view of a piece of composite filament, sheet, or fabric comprising two cemented or bonded plastic materials having different temperature-responsive characteristics or different liquid absorption properties.

Figure 15 is a sectional elevation of the object shown in Figure 14 covered with protective material.

Figure 16 is an elevation in part section, of a system for bonding or cementing fibres or strands to filaments, cords, sheets or the like.

Figure 17 is an elevation of a novel button which may be attached without sewing.

In Figure 1, electrical heating elements 1 are suitably insulated and are covered by metal containers 2 which may have parallel plane surfaces or they may be of other shapes. These heating and charging elements are suitably supported in spaced relationship and the heater terminals are connected to electrical supply lines 3 and 4, through switch 5, as indicated. The output terminals of direct current high voltage supply unit 6 are connected respectively to the metal casings 2 of heater units 1 as shown, through switch 7. Thread, fabric, or sheet 8, of thermoplastic or similar material is placed between casings 2, or it may be moved between them.

In operation, switch 5 is closed to cause heating of elements 2 so that material 8 is softened. Then switch 7 is closed, to apply a D. C. potential of say 4000 volts or more between casings 2, and material 8 is then allowed to cool and harden, under influence of the electrostatic field. Materials such as polystyrene, ethyl cellulose, the acrylics, vinyl polymers or copolymers and many others are suitable for electrical charging. After the material is hardened by cooling, or otherwise, in a suitable electrostatic field, it will be more or less permanently charged so that it can be used. The polar alignment or arrangement of the charges with reference to the length, width, or thickness of the material can be determined by the direction of the applied field.

Threads, filaments, fabrics or sheets can be charged in the above or similar manner and will have special properties not inherent in uncharged materials. Electrically charged threads or fabrics, used in dust mops, dust cloths, air filters, or liquid filters, tend to attract and hold solid particles so that a given quantity of material can hold a greater amount of solids than a similar quantity of uncharged material. In filters, for instance, the charged material makes possible good filtering action even though the pores or spaces are relatively large, so that danger of clogging is reduced.

The charging of material may be arranged in various patterns. In Figure 4, thread, fabric, or sheet 9 can be charged positively on one face and negatively on the other. In Figure 5, the same material 9 is shown charged alternately positively and negatively over adjacent areas, or the charge pattern can be as indicated in Figure 6. If mops or cloths have threads or filaments of predominately or effectively the same electrical sign then there will be repulsion so that air spaces will tend to be maintained. This property may be valuable in certain types of filters, wool-like garments, and for other uses. Where threads or filaments, or fabric areas, are charged oppositely there is a tendency for the fibres or areas to adhere and so to provide a dense structure, for use in certain types of fabrics and fine filters, and for other purposes.

In Figure 2, heating units 2 are of similar construction as the units 2 of Figure 1, and are energized through wires 3 and 4. These units are suitably supported with a space therebetween. Spaced, apertured metal sheets or screen elements 9 are also supported and are connected respectively to the positive and negative terminals of a direct current source of potential, preferably of the order of 4000 or more volts. Blower or fan 10 can be rotated by motor 11 mounted on base board 12 and serves to cool the thread, filament, or fabric 13 which is passed between heaters 2 and then between charged screens 9. Filament or fabric 9 is wound from spool 14, rotatable on axle 15, and supported by leg 16 attached to baseboard 12, and across guide 17 and onto similarly supported spool 18 after passing between heating elements 2, charged screens 9, and guides 19 attached to backboard 20. Suitably energized motor 21 drives spool 18 through the agency of pulley 22.

In operation, if the heating units of elements 2 are energized and if a D. C. high voltage field is established between screens 9, and motors 11 and 21 are energized, then material 13 will be warmed and made somewhat plastic as it passes between heating elements 2. Then, while still plastic, it will be carried between screens or charging elements 9 and will be cooled by fan 10 while still in the electrostatic field between elements 9. Upon hardening in the field, electrical charges will be more or less fixed in material 13 and it is then wound on spool 18. The cooling could of course be done in a refrigerated space. This system therefore provides a convenient method for continuous charging of certain types of thermoplastic or similar materials. Polyester resins, made by combining thermoplastic and thermosetting materials are especially adaptable for electrical charging.

While a single layer material has been illustrated, a plurality of layers of filaments, or fabrics, can be bonded by cement or by stitching or otherwise, as shown in Figure 3. The electrical charges may be distributed in any desired patterns, depending upon the results desired. For instance, the layers may be charged alternately as indicated in order to produce additive fields or the charges may be spotted in any chosen manner, with respect to single layers and also with respect to the composite structure.

Figures 4, 5, and 6 show edge views of fabrics or sheets 9 having bound charges of various + and − signs and distribution, as indicated.

In Figure 7, an electrostatic field is established between rings 23, by connecting them with D. C. potential source 6a so that plastic filament 8 will be charged lengthwise as it is pulled between the rings while soft. It can be allowed to harden while passing between the rings or a fan or other cooling means can be employed. Obviously, a sheet of material can likewise be charged in lengthwise or other direction along the plane of the sheet, by employing charged plates on one or both sides of the sheet.

In Figure 8, filament or thread 24 is formed, by extrusion or otherwise, of tubular or other cross sectional shape having a lengthwise central space. The material may be nylon, acetate, or any suitable substance. Fabrics made of this hollow filament have high capacity to absorb fluids, particularly if tufted. Such fabrics or cloths are, therefore, very advantageous for use in mops, wash cloths, filters, for heat insulation or sound reduction purposes, and for warm blankets or clothing of light weight. For filter purposes the tubular sheath can be punctured at frequent intervals to allow access of fluid to the capillary inner space. Furthermore, the hollow filament may be weighted by allowing it to absorb liquids containing suspended metal particles of colloidal or larger size. Filaments, or cloths woven from filaments of this type are suitable for many applications. For illustration, such fabrics containing metal or other conductive material are suitable for wrapping objects to heat them in high frequency electrical or magnetic fields. The particles may be of other metals. Fabrics of this type can be more efficiently dried by electronic or electrical means.

The tubular filament as shown enlarged in Figure 8 may be filled with carnauba wax or other material 25 which can be electrically charged or polarized.

As shown in Figure 9, filament or fabric 26 may comprise a nylon, rayon, or other plastic or resilient substance like vinyl compounds or rubber. Metal particles 27, which may be of colloidal size or larger, are admixed with the rayon or other binding material. This admixture can take place in batches before the filaments are extruded or the metal particles can be later pressed, projected, or otherwise mixed with the filament binder material.

Figure 10 illustrates a filament extruded in helical form. This shape may be attained by twisting or rotating the filament as it is hardened in an acid or other bath after being extruded. The rotation can be effected by a small ring or eye, through which the filament is passed, revolving in a circle of small radius. Other methods such as softening filaments by heat and then forming helical threads or cords by rotating or twisting, and then cooling them, can be used. Fabrics woven from closely wound or twisted filaments of this type have resiliency and good heat insulation properties due to relatively large, more or less, enclosed air spaces. Such fabrics are suitable for making blankets, coats, and the like, as well as expansible type articles.

Filaments may likewise be kinked as shown in Figure 11. This shaping may be done in the hardening bath or afterward. Fabrics woven from kinked filaments provide warmth, and "fluffiness." Similarly, fabrics may be woven from round, ribbon-type, or other filaments, twisted as indicated in Figure 12. The filament may be twisted as it is hardened, after being extruded, so that it will retain a permanent set.

As illustrated in Figure 13, filament 28 is electrically charged or polarized by an electrical field between positively and negatively charged metal plates 29 and 30 which may be coated with rubber or other protective or insulating material. These plates are supported in hardening bath 31 held in a compartment of container 32. Therefore as the filament is extruded from nozzle 33, it is polarized or charged by the electrical field, while soft, and the polarization becomes fixed as the filament is hardened. The same principles may be applied to sheets and other shapes or structures.

Container or vessel 32 may have one, or several compartments as shown so that, filament 28 may be moved through several treating or washing baths, over idler pulleys 30b until the filament is wound on spool 31a which is rotated by the pulley of motor 31b. Nozzle 33 is fastened in leak-proof manner in a hole in cover plate 29a, which may be tightly clamped to casing 32, and is connected with a source of plastic or liquid under pressure, such as the base liquid for rayon, for example. Pipe 30a is similarly fastened in a vertical wall of vessel 32 and is connected with a source of air or other gas under pressure so that the fluid bath or baths in vessel 32 will be under substantially more than atmospheric pressure.

In operation, assuming that fluid 31 is an acid or other bath for fixing or hardening the extruded filament, then the bath liquid will be forced into the material of the filament more quickly since the bath fluid is under pressure. Therefore the rate of hardening the filament will be accelerated and the rate of extrusion and the output of rayon or other filament may be increased. The same situation will exist in the other baths if used. In the event that only one bath fluid is used, the entire compartment or vessel can be filled with that fluid under pressure. In addition to the faster hardening, the increased pressure of the bath fluid also tends to make a denser, stronger filament.

In Figure 14, the filament or sheet illustrated in section comprises plastic or other material 34 cemented or bonded by heat, or otherwise, to material 35 of different temperature or water absorption characteristics. For instance strip 34 may be of nylon and strip 35 may be of rayon, or strip 34 may be made of polystyrene and strip 35 may be made of cellulose acetate or acrylic copolymers which have higher water absorption characteristics than polystyrene. Therefore filaments or sheets made of bonded polystyrene and acrylic copolymers or the like will bend to different degrees according to the relative degree of water absorption of the component parts, since the absorption of water causes dimensional changes in plastic and similar materials. Composite filaments, rods, tubes, or sheets of the type described will therefore serve as humidity indicators or for other hygroscopic measurements or uses.

Furthermore, various plastics and similar materials have different temperature coefficients of expansion. Therefore a filament, strip or sheet made of two bonded plastic or other materials having different coefficients of expansion, may be used for temperature indicators. Thermostats and the like made of such composite bonded structure will bend with temperature change due to the different rates of expansion or contraction with change of temperature. Filaments made of bonded material of different expansion characteristics and woven or otherwise made into fabrics or other materials will tend to curl and maintain spaces between the filaments, thereby producing a resilient "fluffiness" or heat insulation character, besides providing other desirable features. This is especially true of tufted fabrics or those having filaments with numerous free ends.

As illustrated in Figure 15, the plastic or other sheets or filaments 34 and 35 of Figure 14 can be coated with rubber, metal foil, or other flexible material 36 in order to protect the bonded elements 34 and 35 from exposure to moisture. The composite structure will then bend with change of temperature and will not be affected by moisture.

In Figure 16, filament or fabric 37 is passed through tank 38 containing preferably quick-drying adhesive or bonding liquid 39. The cord or filament 37 is guided by roller or pulley 40 and pulley 41, suitably mounted. Metal elements 42 are mounted above the tank, near cord 37 and may be charged to high electrical potential to charge cord or filament 37 electrically, by ionization of air or otherwise. The cord can also be charged by passing over a pulley which is charged to high potential. After passing between elements 42, or through a similar apertured element, the cord, thread, or filament passes through hole 43 in plate 44 which is suitably supported and which may be plane or which may slope downward toward the hole.

Fibres, bristles, or strands 45, of any suitable material, are kept supplied to plate 44 and may be electrically charged oppositely to the charge on filament or sheet 37. Therefore bristles or fibres 45 are electrically attracted to filament or sheet 37 as it passes and so the fibres 45 are held by the adhesive-coated filament or sheet 37. The adhesive can be quickly dried by warm air from a fan 46 or the filament can be moved through an oven before being passed over pulley 41, for winding. If it is desired that fibres 45 be attached only at their ends, it is preferable that they be blown endwise onto element 37, or that their ends be electrically charged or polarized by contact with a charged element or otherwise.

The resultant material, in the case of a cord or filament, will have a radially arranged pile so that soft, resilient, and warm fabrics can be woven therefrom suitable for rugs, coats, filters and many other uses. In case element 37 is a woven fabric, or sheet, the pile will be attached to one or both surfaces as desired.

In Figure 17, button 47 is integral with or attached to sharp prongs or tines 48 which are made of thermoplastic or other suitable material, like nylon for instance. The entire button may be of plastic material or a metal or other button 47 can be cemented or otherwise fastened to the plastic prongs 48. In use, the tines or prongs are pushed through fabric or other material to which the button is to be attached, and a hot iron is applied to the prongs which soften and become flattened under pressure of the iron which is then removed. The flattened prong material then cools and acts as a flange or small button to lock the principal button 47 to the garment or other object. One, or a plurality of prongs, as indicated, can be employed. This button can be attached much more quickly than buttons which are attached by sewing. A flexible connection of fabric, cord, plastic, or otherwise can connect the button and the plastic prongs, if desired.

While I have shown and described various modifications of the invention, it is obvious that numerous changes of detail and arrangement can be made without departing from the spirit of the invention.

What I claim is:

1. A fabric material, said material being electrically polarized lengthwise thereof.
2. A composite fabric comprising a plurality of fabric layers, said layers being alternately oppositely electrically polarized.
3. An elongated, hollow filament-like element for making fabrics therefrom, said element containing pliable material electrically polarized, to provide a substantially permanent field.
4. A pliable material, said material being electrically polarized lengthwise thereof.
5. A pliable material, said material being electrically polarized lengthwise thereof for a plurality of successive lengths thereof.
6. A pliable material, said material having a plurality of alternate positive and negative electrical charges along the length thereof producing electrical fields directed lengthwise thereof.
7. An electrically charged material, said material having a plurality of alternate positive and negative electrical charges along the length thereof, producing electrical fields directed lengthwise thereof.
8. An electrically charged material, said material having a surface and a plurality of alternate positive and negative electrical charges producing electrical fields directed substantially parallel with a portion of said surface and adjacent thereto.
9. An elongated, hollow, filament-like element for making fabrics therefrom, said element being formed as an extrusion of plastic material and electrically charged to produce a plurality of positive and negative charges in said material.
10. An elongated, hollow, filament-like element containing pliable material electrically polarized to provide a substantially permanent field.

References Cited in the file of this patent

UNITED STATES PATENTS

| | | |
|---|---|---|
| Re. 22,419 | Smyser | Jan. 11, 1944 |
| 1,572,873 | Allcutt | Feb. 16, 1926 |
| 1,891,780 | Rutherford | Dec. 20, 1932 |
| 1,918,848 | Land et al. | July 18, 1933 |
| 1,997,263 | Meissner | Apr. 9, 1935 |
| 2,087,260 | Mitler | July 20, 1937 |
| 2,128,907 | Benner et al. | Sept. 6, 1938 |
| 2,385,687 | Carnahan | Sept. 25, 1945 |
| 2,385,873 | Melton | Oct. 2, 1945 |
| 2,390,162 | Meyer et al. | Dec. 4, 1945 |
| 2,401,642 | Hiltner et al. | June 4, 1946 |

FOREIGN PATENTS

| | | |
|---|---|---|
| 535,377 | Great Britain | Apr. 8, 1941 |
| 555,010 | Great Britain | July 29, 1943 |
| 650,988 | Great Britain | Mar. 7, 1951 |